UNITED STATES PATENT OFFICE 2,239,478

PAINT

Linton C. Amberson, Edenburg, Pa.

No Drawing. Application February 9, 1940,
Serial No. 318,178

1 Claim. (Cl. 134—45)

The present invention relates to paints of the "aluminum paint" type, which are especially suitable for application to heated metal (iron or steel) surfaces, e. g., surfaces of automobile engines, steam pipes, steam radiators, furnaces, stoves, etc., which articles to be coated do not have to first be cooled down. They may be rather hot, e. g., at 100° C. or even considerably above such temperature. Since the vehicle contains water, and dries by the evaporation of water, the paint will dry more quickly applied to a hot surface than to a cold one.

An object of the invention is the production of a paint, of the kind set forth, that will dry rapidly, without the production during drying or later, of smoke or odors, in noticeable or objectionable amounts, and which will leave on the surface, a tough, strong, brilliant, non-discoloring surface, that will remain for a long time, and which will be easily cleaned by brushing, washing with water, with or without soap or similar detergents, will prevent rusting and will not rub off by the ordinary wear and tear to which such articles are commonly subjected. A further object is the provision of a vehicle for such paint, which will be capable of producing, when pigment of the kind specified is mixed therewith, a paint having the properties stated.

The vehicle of the paint is preferably made up by the following procedure:

Sodium silicate, strong aqueous solution (waterglass) of 35% to 38% commercial grade is the largest component. A measured quantity of this, say 60 gallons is used. It is to be understood that other alkali metal silicates could be used.

The silicate solution used may have a specific gravity of about 1.38 to 1.40, and is of a syrupy consistency. Such a solution is of about 35 to 37% strength, and of about 40° to 41.4° Bé.

A vegetable gum, preferably gum tragacanth, after being swelled in water, is dissolved in water, about an ounce of the gum tragacanth to a gallon of water. This gives a strong solution. 15 gallons of this are added to the above quantity of silicate.

A solution of cornstarch and sugar is then made as follows—2 ounces of cornstarch are dissolved in each gallon of water. This may be done by first making a readily flowable suspension of the starch in a little of the water, cold, and pouring this into the rest of the water, while the latter is kept boiling. Or the starch may be mixed with all the water, while cold, and steam bubbled into this water, while the same is being stirred. To 15 gallons of this hot starch solution is added 80 lbs. of cane sugar, and the same stirred until dissolved. This solution is then added to the silicate and gum solution.

In place of pure starch, it is to be understood that materials consisting largely of starch, e. g., corn flour, dried and pulverized potato or sweet potato, etc., can be substituted. The term "starchy material" includes such substitutes. Instead of cane sugar, beet sugar can be used equally as well. Mixtures of such sugar with glucose can be used with fairly satisfactory results. Cane or beet sugar is preferred.

If desired, for reducing the alkalinity and for improving the final product, a small amount of a mild acid material such as boric acid or alum, may be added either to the silicate solution or to the gum solution or to the starch-sugar solution or to the mixture of the three components. The amount of such acid or alum should be such as to neutralize a small part but not all, of the alkalinity naturally present in the commercial silicate solution. About half an ounce to two ounces of the boric acid or alum to a gallon of the silicate solution (i. e., about 0.3 to 1.2% by weight), will be ample, depending on the alkalinity of the silicate solution. This component can be dispensed with, if desired.

It is preferable to add a small amount of a preservative to prevent molding of the mixture during storage. The commercial material "Mold-ex" may be used, 18 ounces to 100 gallons of the completed vehicle. Other suitable materials for this purpose are formaldehyde (37–40% solution) or carbolic acid or cresol. This component can be omitted if desired.

I do not desire to be limited to any theories, but my belief is that the gum improves the consistency of the final mixture, and the starch makes the paint smoother and hence easier to apply, and acts as a plasticizer in the paint film, and that the sugar overcomes brittleness in the final film of paint, after application and drying.

To the vehicle, prepared as above, is added fine aluminum pigment, which may be in scale form. Alloys of aluminum (such as aluminum bronzes) that have about the same color as aluminum itself, in finely divided state, i. e., of pigment size, which particles can also be flattened, can also be used. Alloys of aluminum which are of a gold color, i. e., yellow, do not give satisfactory results, with this vehicle; in other words, gold colored aluminum bronze does not give a stable satisfactory paint. The amount of pigment may be about one pound, per gallon of the vehicle.

After well mixing the above stated desirable pigments with the vehicle, the pigment stays well mixed in the vehicle. The mixture is preferably allowed to stand for a few days, or until it stops giving out gas. Some gas may be liberated from the mixed paint, during the first day, or during the first few days after so mixing the paint. The gas so liberated may be hydrogen liberated by action of any free alkali upon a little of the pigment. The use of boric acid or alum or equivalent may reduce the amount of such action, in addition to giving a tougher paint film, when applied.

It will be understood that in addition to the aluminum or aluminum-like pigment, other pigments, such as heat-resistant coloring materials can be added.

The proportions given in the foregoing, have been found very satisfactory, but I do not limit the invention to these precise proportions. The proportion of each component can be varied up to 10 or 15%, more or less, while still giving satisfactory results.

In place of the alum mentioned above, aluminum sulphate or other aluminum salt (especially water-soluble aluminum salts) can be employed.

While aluminum powder mixed with sodium silicate solution, in the above proportions, would produce a paint, the aluminum would soon settle out and the film of paint would scale off within a short time after application.

While I have referred to applying the paint to hot metal surfaces, it can be applied while the surface is cold, and thereafter the surface warmed up or heated, to assist in drying. But it will also dry in the cold, but more slowly.

I claim:

A paint suitable for application to hot metal surfaces, which contains the following substances in about the proportions stated:

60 gallons waterglass of 35 to 37% concentration,
15 ounces of gum tragacanth,
30 ounces of starch,
80 lbs. of sugar,
30 gallons of water,
  reaction products of the waterglass with
30 to 120 ounces of a material selected from the
  group consisting of alum and boric acid,
90 lbs. of finely powdered aluminum pigment.

LINTON C. AMBERSON.